United States Patent [19]

Jäger et al.

[11] Patent Number: 5,020,658
[45] Date of Patent: Jun. 4, 1991

[54] CONNECTION ARRANGEMENT TO PROVIDE IN ENDLESS BAND

[75] Inventors: Arnold Jäger, Gehrbergsweg 6, D-3164 Burgdorf; Claudius Jäer, Burgdorf, both of Fed. Rep. of Germany

[73] Assignee: Arnold Jäger, Burgdorf, Fed. Rep. of Germany

[21] Appl. No.: 478,094

[22] Filed: Feb. 9, 1990

[30] Foreign Application Priority Data

Feb. 10, 1989 [DE] Fed. Rep. of Germany ....... 3903921

[51] Int. Cl.⁵ ............................................. B65G 15/30
[52] U.S. Cl. .................. 198/844.2; 198/850; 474/253; 474/257; 24/33 B
[58] Field of Search ............... 198/848, 850, 853, 851, 198/698, 699, 844.2; 474/218, 250, 257, 253; 24/33 B, 33 M, 33 R, 33 F, 33 P

[56] References Cited

U.S. PATENT DOCUMENTS

| 2,185,563 | 1/1940 | Palmer | 24/33 M |
| 3,737,954 | 6/1973 | Tabler | 198/844.2 X |
| 4,653,156 | 3/1987 | Stolz et al. | 474/257 X |
| 4,815,587 | 3/1989 | Musil | 198/844.2 X |

*Primary Examiner*—Joseph E. Valenza
*Assistant Examiner*—Keith L. Dixon
*Attorney, Agent, or Firm*—Robert W. Becker & Associates

[57] ABSTRACT

A connection arrangement to provide an endless belt, especially for a screening rod belt. The band ends are securely disposed between essentially U-shaped fittings that are held together by a transverse pin. To better utilize the band strength, the lateral edges of the legs of the fittings are provided with bent portions against the greatest portion of which the side surfaces of the bands rest. Securement elements are used for the fittings and the band ends, and are driven in the manner of nails accompanied by displacement of material.

15 Claims, 1 Drawing Sheet

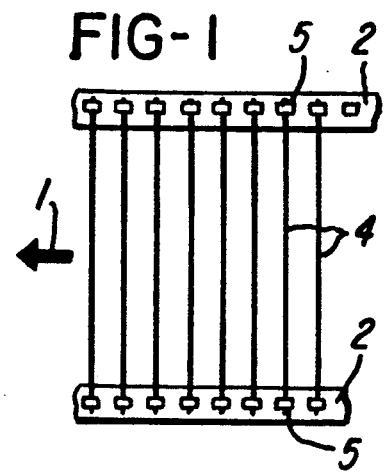
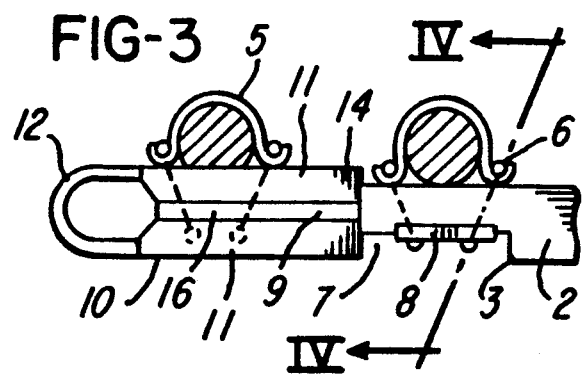
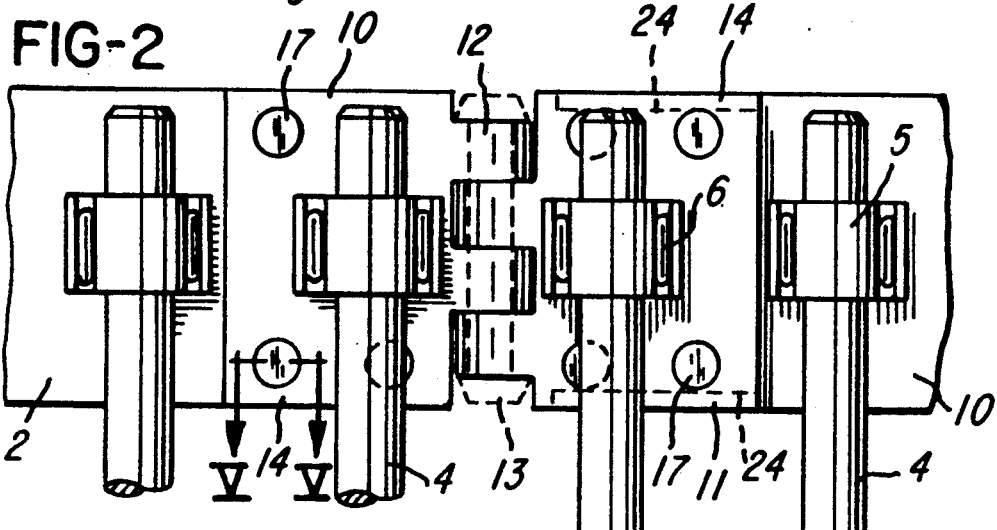
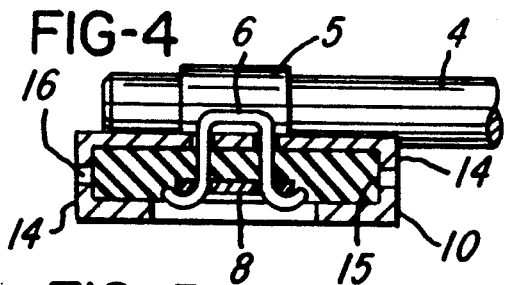
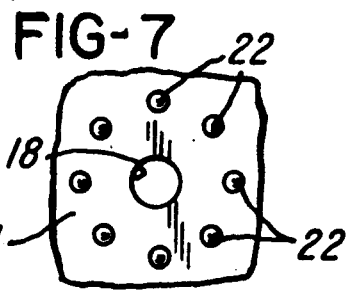
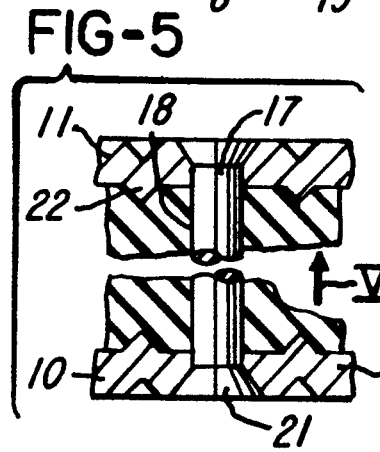
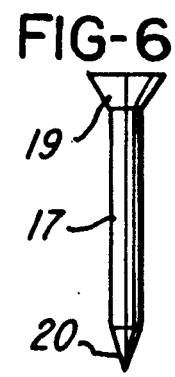
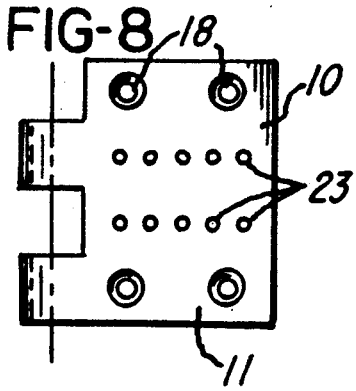

CONNECTION ARRANGEMENT TO PROVIDE IN ENDLESS BAND

BACKGROUND OF THE INVENTION

The present invention relates to a connection arrangement to provide an endless, inextensible, flexible, flat band especially for a screening rod belt such as used on agricultural harvesters. With such a connection arrangement, band ends are securely disposed between legs of essentially U-shaped fittings of metal or the like, with the fittings being held together by a transverse pin and whereby rivet-like securement elements extend through the legs of the fittings and through the band ends.

With heretofore known connection arrangements of this type, the ends of the bands must be provided with holes in order to be able to introduce rivets or bolts through the bands. Unfortunately, such holes lead to an undesirable weakening of the bands. As a result, the band strength that exists is only inadequately taken advantage of.

It is an object of the present invention to eliminate these drawbacks. Accordingly, it is an object of the present invention to provide a band connection arrangement of the aforementioned general type where the strength of the band is extensively taken advantage of and the connection location can be kept spatially small.

BRIEF DESCRIPTION OF THE DRAWING

These and other objects and advantages of the present invention will appear more clearly from the following specification in conjunction with the accompanying schematic drawing, in which:

FIG. 1 is a partial plan view of a belt with rods for a rod belt conveyer of an agricultural harvester;

FIG. 2 is an enlarged partial plan view of the edge of the belt with rods of FIG. 1, and in particular shows the region of one exemplary embodiment of the inventive connection arrangement for one of the two lateral bands;

FIG. 3 is a cross-sectional side view of the band of the connection arrangement of FIG. 2;

FIG. 4 is a cross-sectional view taken along the line IV—IV in FIG. 3;

FIG. 5 is a fragmentary cross-sectional view taken along the line V—V in FIG. 2;

FIG. 6 shows a securement element prior to being driven into a band end;

FIG. 7 shows part of the inner side of the fitting of FIG. 5 and is taken in the direction of the arrow VII thereof; and FIG. 8 is a plan view of a fitting that is modified from that shown in FIG. 2.

SUMMARY OF THE INVENTION

The connection arrangement of the present invention is characterized primarily in that the lateral edges of the legs of the fittings are provided with bent portions against which a large portion, and preferably the greatest portion, of the side surfaces of the band rest, with the securement elements being driven through the band ends, which have no holes for receiving the same, accompanied by displacement of the material of the band ends.

Thus, no preparatory steps, in other words the aforementioned holes in the band ends, are undertaken. The securement elements, which are in the form of nails or the like, are driven in in a simple manner without thereby damaging or even destroying parts of the band ends that lend strength thereto. Furthermore, the band ends are also laterally encased by the aforementioned bent portions of the fitting legs, thereby preventing the displacement of material, which is effected when the securement elements are driven in, from leading to an undesired deformation of the band ends that could even lead to destruction thereof. A so to speak cage-like enclosure of the band ends results that leads to high pretensions when the securement elements are driven in. This is in particular the case if the bands are made essentially of rubber or rubber-like material and are provided with woven fabric sets or the like in the rubber as loadcarrying means.

Further specific features of the present invention will be described in detail subsequently.

DESCRIPTION OF PREFERRED EMBODIMENTS

Referring now to the drawing in detail, the partial belt with rods illustrated in FIG. 1 is part of an endless rod belt conveyor that rotates in the direction of the arrow 1. At both edges, the belt is provided with inextensible, flexible bands 2 having teeth 3 disposed on their inner side. The bands 2 are interconnected by steel rods 4 that extend transversely and hence enable conveyance of the harvested material as well as the screening thereof.

The belts 2 are made of rubber or the like and are provided with load-carrying means, for example longitudinally extending cables or even sets of woven fabric. All of the parts are securely vulcanized together. In this connection, the upper and lower sides are formed of non-reinforced rubber or the like.

The ends of the rods 4 are secured to the backs of the bands 2 by steel brackets 5 that extend over the rods 4 and are held at the ends of their bent arms by forced-in steel clamps 6, the ends of which pass through metal plates 8 disposed on the underside in the recesses 7 between the teeth 3, with these ends of the steel clamps 6 being anchored by being bent over.

Essentially U-shaped steel fittings 10 serve to connect the ends 9 of the bands 2. The legs 11 of the fittings 10 rest securely against the upper and lower side of the band ends 9. At their free ends, the fittings 10 have parts 12 that mesh with one another, are rounded, and serve to receive a joint pin 13.

On both sides of the bands 2, the fittings 10 are provided with bent portions 14 against which the greatest portion of the side surfaces 15 of the bands 2 securely rest in the region of the fitting 10. Only a small gap 16, which in practice should be approximately 1-2 mm, is disposed between the bent portions 14 of a fitting 10. Thus, when viewed in a cross-sectional manner, as shown in FIG. 4, an encasing of the band ends 9 results.

The band ends 9 are secured between the legs 11 of the fitting 10 by pin or rivet-like securement elements 17; these securement elements pass through holes 18 in the legs 11, and also pass through the band ends 9. An example of a securement element 17 is illustrated in FIG. 6. This securement element has a head 19 and at the opposite, bottom end has a point 20 on the shaft. This makes it possible to drive or shoot the securement element 17 in accompanied by displacement of the material, i.e. the rubber and the reinforcing inserts. After having been driven in, the shaft is deformed at the bottom and is provided with a rivet head 21 (see FIG. 5).

As a consequence of the lateral encasement of the band ends 9 with the aid of the bent portions 14, the rubber is not in a position to be displaced. Rather, a high inherent internal tension results along with a correspondingly high holding force. In order in addition to increase the pretension in the region of the holes 18, the inner surface of the legs 11 about the hole 18 is provided with stud-like projections 22 that are uniformly distributed about the hole 18. Also by means of these projections the rubber is prevented from being displaced, i.e. being greatly displaced if the tension is reduced.

It would also be possible to provide bent portions on that portion of the fitting 10 that faces the part 12 thereof; however, it is in no way absolutely necessary to do so.

The securement of the brackets 5, with the aid of the clamps 6, centrally on the legs 11 between the holes 18 is effected via the similarly driven-in steel clamps 6. For this reason, it is also possible to provide the legs 11 with rows 23 of holes in order to dispose the brackets 5 at different positions and to therefore be able to obtain different separations (spacing of the rods 4 from one another) with the sam fitting. This measure also results only via the similarly forced-in steel clamps 6, which require no preparation of the band ends 9 in the way of holes or the like.

It should also be noted that it is expedient to provide the lateral outer surfaces of the band ends 9 with a flat recess so that the bent portions 14 do not lead to a spreading in the region of the connection location (see, for example, the dashed line 24 in FIG. 2).

It should also be noted that instead of securing the ends of the rods 4 with the aid of steel brackets 5, it is possible to hold the ends of the rods by providing them with holes, preferably two holes, through which the securement elements 17, or also separate securement elements, can then be guided, with these securement elements being driven in like nails as is the case with the securement elements 17.

The present invention is, of course, in no way restricted to the specific disclosure of the specification and drawing, but also encompasses any modifications within the scope of the appended claims.

What we claim is:

1. In a connection arrangement to provide an endless, inextensible, flexible, flat band that is essentially made of rubber or rubber-like material and reinforcing inserts, especially a band for a screening rod belt, especially for an agricultural harvester, whereby band ends are securely disposed between legs of essentially U-shaped fittings of metal or the like, with said fittings being held together by a transverse pin, and whereby rivet-like securement elements extend through said legs of said fittings and through said band ends, the improvement wherein:

said legs of said fittings have lateral edges that extend in the direction of rotation of said band, with said lateral edges of said legs being provided with portions that are bent toward one another and against which a large portion of side surfaces of said band ends that are held between said legs rest; and said securement elements are driven through said band ends, which have no holes for receiving same, accompanied by displacement of material of said band ends.

2. A connection arrangement according to claim 1, in which the greatest portion of said side surfaces of said band ends rest against said bent portions of said lateral edges of said legs of said fittings.

3. A connection arrangement according to claim 1, in which a narrow gap is provided between said bent portions of adjacent legs of a fitting.

4. A connection arrangement according to claim 1, in which said legs of said fittings are provided with holes for receiving said securement elements; and in which that side of said legs that faces said band end is provided, in the vicinity of said holes, with projections.

5. A connection arrangement according to claim 4, in which said projections have a lug-like shape.

6. A connection arrangement according to claim 4, in which said projections are distributed about said holes of said legs.

7. A connection arrangement according to claim 1, in which said fittings are provided with further bent portions for abutment against end faces of said band ends.

8. A connection arrangement according to claim 1, which includes securing means for holding rod ends on said band; and in which further securement elements are driven through said securing means in the vicinity of said fittings in a manner similar to said rivet-like securement elements.

9. A connection arrangement according to claim 8, in which rivet-like securement elements are disposed in the vicinity of edges of said band, and said securing means are disposed therebetween in a central portion of said band.

10. A connection arrangement according to claim 8 in which said fitting is provided with at least one row of holes for said securing means to permit adjustment of spacing between rods.

11. A connection arrangement according to claim 1, in which said band ends, in the vicinity of said bent portions of said legs are provided with flat recesses to receive said bent portions.

12. A connection arrangement according to claim 11, in which said recesses are dimensioned such that outer surfaces of said bent portions are at least approximately flush with side surfaces of said bands.

13. A connection arrangement according to claim 1, in which upper and lower surfaces of said bands are provided with rubber layers between which said reinforcing inserts are disposed, with all parts being vulcanized together.

14. A connection arrangement according to claim 13, in which said reinforcing inserts are load-carrying means in the form of a woven fabric insert.

15. A connection arrangement according to claim 1, in which rod ends are provided with holes for receiving therethrough securement means in a manner similar to said rivet-like securement elements.

* * * * *

UNITED STATES PATENT AND TRADEMARK OFFICE
CERTIFICATE OF CORRECTION

PATENT NO. : 5,020,658

DATED : 4 June 1991

INVENTOR(S) : Arnold Jäger et al

It is certified that error appears in the above-identified patent and that said Letters Patent is hereby corrected as shown below:

On the title page, the inventors should read as follows:

[75] Inventors: Arnold Jäger, Gehrbergsweg 6, D-3164 Burgdorf; Claudius Jäger, Burgdorf, both of Fed. Rep. of Germany Signed and Sealed this Twenty-second Day of September, 1992

Attest:

DOUGLAS B. COMER

Attesting Officer     Acting Commissioner of Patents and Trademarks